United States Patent [19]

Rodriguez

[11] 4,235,660

[45] Nov. 25, 1980

[54] APPARATUS FOR REPAIRING SPROCKET HOLES ON STRIP MATERIAL

[75] Inventor: Daniel E. Rodriguez, Altadena, Calif.

[73] Assignee: James S. Stanfield, Los Angeles, Calif.

[21] Appl. No.: 17,394

[22] Filed: Mar. 5, 1979

[51] Int. Cl.$^3$ .......................... B32B 31/00; B31F 5/00; B65N 23/32; B65N 27/00

[52] U.S. Cl. .................................... 156/516; 156/554; 156/555; 226/198; 242/76; 352/224

[58] Field of Search ................. 156/94, 554, 516, 522, 156/555, 209; 242/76; 226/196, 198; 352/224

[56] References Cited

U.S. PATENT DOCUMENTS

| | | | |
|---|---|---|---|
| 1,966,684 | 7/1934 | Pollock | 226/196 |
| 3,547,370 | 12/1970 | Unterdurrbach | 242/76 |
| 3,588,346 | 6/1971 | Ramig | 242/76 |
| 3,959,048 | 5/1976 | Stanfield | 156/94 |
| 4,001,073 | 1/1977 | Jones | 156/554 |
| 4,026,756 | 5/1977 | Stanfield | 156/94 |
| 4,052,245 | 10/1977 | Kuts | 226/198 |

*Primary Examiner*—Douglas J. Drummond

*Attorney, Agent, or Firm*—Freilich, Hornbaker, Wasserman, Rosen & Fernandez

[57] ABSTRACT

Apparatus for repairing sprocket holes on strip material, such as motion picture film, with pressure adhesive tape having holes is provided with improved guide means for feeding material through a sprocket wheel mounted on a shaft at a repair station, an improved means for pressure bonding repair tape on material at the sprocket wheel, an improved sprocket design, and a cutting knife (attached to a knob which can be pushed in on the shaft against the force of a spring and which is used to turn the sprocket wheel) aligned with a slot in the sprocket wheel to cut the repair tape after repairs have been made, but only when the knife and a slot in the sprocket wheel are in a position where a pin in the knob that passes through the sprocket wheel can also pass through a hole in a wall that supports the shaft so the knife will cut only the repair tape, and not the tape and the material. A second embodiment uses a motor to turn the sprocket shaft, and a friction clutch at the end of the shaft to engage the knob. Dual tracks and sprocket wheels are provided for use of the apparatus with material of different gauges.

19 Claims, 9 Drawing Figures

APPARATUS FOR REPAIRING SPROCKET HOLES ON STRIP MATERIAL

BACKGROUND OF THE INVENTION

This invention relates to an apparatus for aligning and bonding a preperforated tape to perforated material, such as motion picture film and the like, and more particularly to improvements to such apparatus.

In ordinary use, the perforations along motion picture film are engaged by drive sprockets or a shuttle arm used to feed the film through a utilization system. As the film is used again and again for its intended purpose, film tends to tear around the perforations, particularly at the beginning and end of a reel of film. In those, and other cases of damage to the perforations, it is desirable to repair the film by bonding a strip of preperforated tape along the film where damage has occurred, with the perforations of the tape aligned with the sprocket holes of the film.

U.S. Pat. No. 3,959,048 discloses an arrangement for bonding preperforated repair tape to motion picture film with the precision required to align the tape perforations with the film perforations along the length of the tape, but the alignment system is complex, and leaves much to be desired. Improvements over that arrangement are disclosed in U.S. Pat. No. 4,026,756. The improvements deal primarily with the problem of aligning the perforations of the repair tape with the perforations of the film along the length of the film.

It has been determined that the asymmetrical sprocket shape disclosed in U.S. Pat. No. 4,026,756 is not required for synchronization, and may itself cause damage to the film since flat sides are provided on the sprocket to force alignment of perforations in the tape with perforations in the film. Instead, it has been found that symmetrical sprockets of the same configuration as sprockets in the film utilization system will best serve the need for alignment of repair tape without any risk of further damage to the perforations in the film. Alignment of the perforations in the repair tape with perforations in the film will be achieved, even though the film tends to shrink with age and other factors, as mentioned in the prior patents.

What is now recognized is the need to improve transverse alignment of the repair tape to maintain side edges of holes in the repair tape in line with side edges of holes in the film, and to assure firm bonding of the repair tape on the film with a minimum handling of the tape, i.e., with a minimum of wheels, guides, sprockets, and the like, between a film supply reel and a take-up reel in order to avoid any risk of damage to the film and/or the repair tape bonded to the film. Beyond that, there is a need to simplify operation of the system, both in terms of placing film in the apparatus and applying repair tape, and in cutting the repair tape at the end of a repaired section, and removing the film from the apparatus.

The term "film" is used hereinafter to refer to any unrestricted length of material with aligned and evenly spaced perforations to be repaired, and the term "sprocket holes" is used hereinafter to refer to those holes. Motion picture film is, of course, a primary example, but the present invention is not to be construed to be limited to a film for motion pictures. The film may be a strip of material for other purposes as well.

SUMMARY OF THE INVENTION

In accordance with the invention, a sprocket wheel on a shaft at the repair station pulls repair tape from a roll on a spindle for bonding onto perforated film fed directly from a supply reel (not shown) through a straight and elongated guide to the sprocket wheel. There a pressure roller on a spring loaded lever presses the film onto the repair tape for pressure bonding. From the repair station, the film passes directly to a take-up reel (not shown) past a flat-surfaced member positioned at the same level and very nearly parallel to the input (feed) guide. The upper surface of that member is displaced from the exact parallel position to dip the end nearest the sprocket wheel sufficiently to assure that the film is engaged by one of two sprockets at all times as the sprocket wheel is turned. The spindle for the repair tape is positioned on the take-up side of the repair station to assure that the repair tape is wrapped over about 180° of the sprocket wheel, which is manually turned on the axis of its mounting shaft extending from a wall of a supporting base by a knob on the end of the shaft.

The knob is free to slide on the shaft against the force of a spring from a position away from the sprocket wheel to a position very near the sprocket wheel. A pin offset from the shaft axis is secured to the knob, but not to the sprocket wheel. Instead the pin extends through a hole in the sprocket wheel to the surface of the supporting wall. The knob has a knife blade secured to it that extends in the direction of the sprocket wheel, but only from the knob to near the sprocket wheel when the knob is in its spring-loaded position away from the sprocket wheel. A slot in the sprocket wheel allows the cutting edge of the knife blade to pass over the repair tape when the knob is pushed in, but only while the pin is in alignment with a hole or slot so positioned in the supporting wall as to assure that the cutting knife will cut across only the repair tape, preferably in a position about 90° ahead of where the repair tape comes in contact with the film. The repair tape may thus be quickly cut after a section of tape has been repaired, without risk of also cutting the film.

One or more sprocket wheels may be mounted on the cantilevered shaft, one for each different gauge of film. For each sprocket wheel there is a flat elongated guide of appropriate width in proper alignment with the sprocket wheel. Each guide consists of two side walls, each wall extending from a flat plate. One wall of each guide has a flange overhanging the flat plate, and the other wall of each guide has a central section detached from the rest of the wall by slots perpendicular to the flat plate. This central section has a flange overhanging the flat plate, and a large flange extending in the opposite direction to provide a place for an operator to push and thereby bend the central station away from the opposite wall of the guide. A film then placed with one edge against the opposite wall can then be dropped into the guide while the central section of the slotted wall is pushed outwardly.

In a second embodiment, a motor drives the sprocket shaft, and through a friction clutch on the end of the shaft also drives the knob, which then turns the sprocket with the shaft. A spring forces the knob against the friction clutch surface for drive engagement. Should the film stop for whatever reason, the clutch will stop rather than break the film, and pushing the knob in even slightly will disengage the clutch to allow the sprocket to be turned manually with or without the motor driving the shaft.

DESCRIPTION OF PREFERRED EMBODIMENTS

Figure 1:
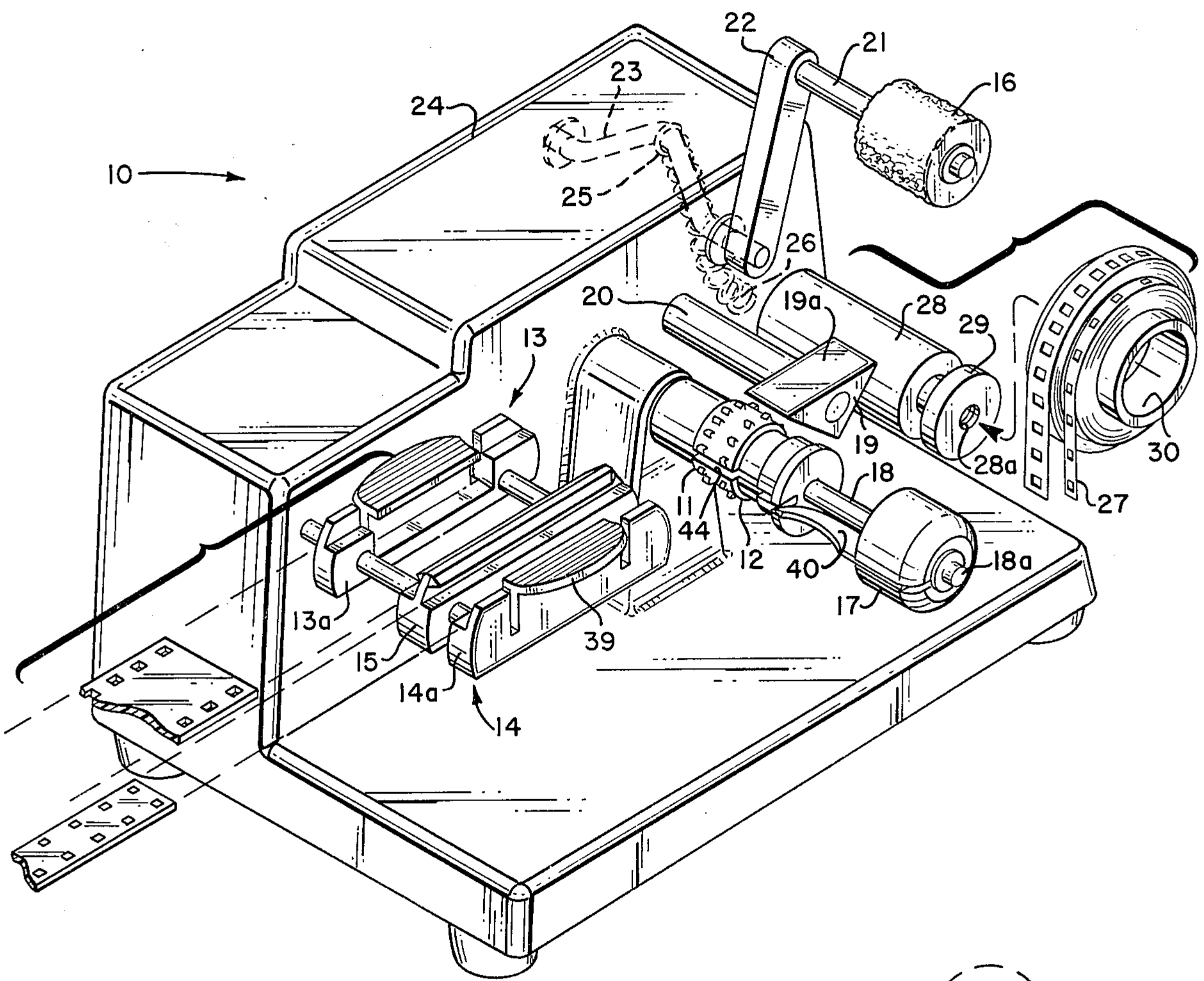
FIG. 1 is a perspective view of a first embodiment of the invention.
Figure 2:
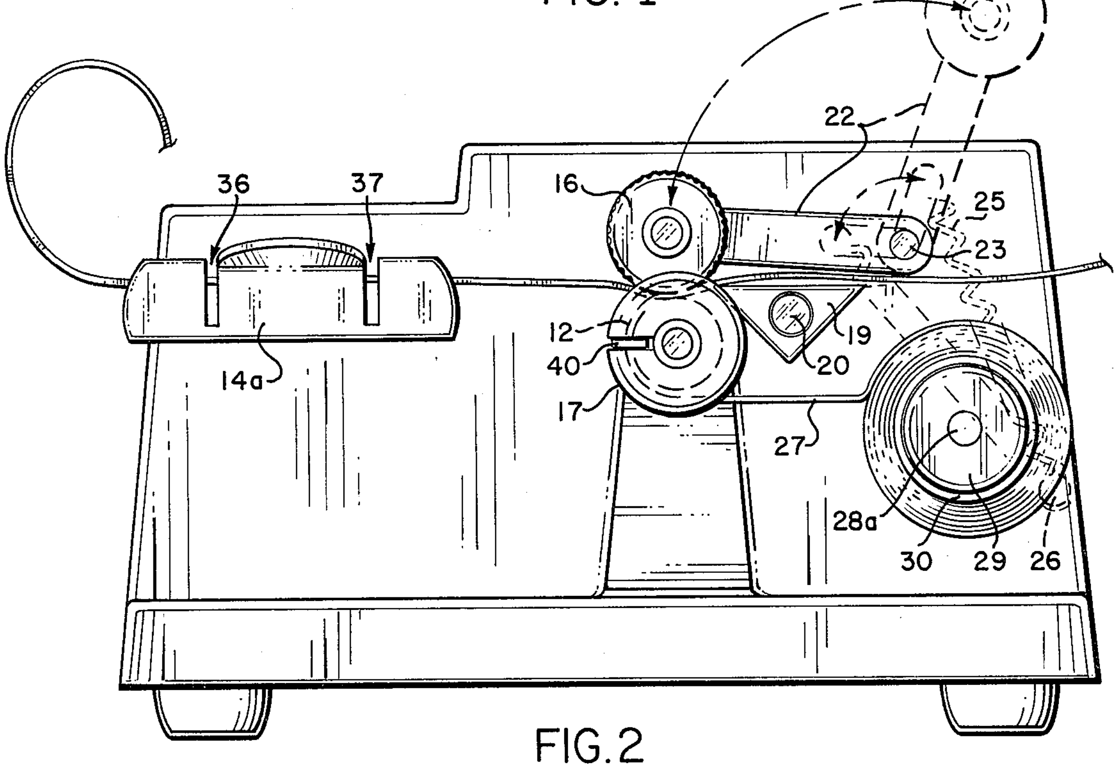
FIG. 2 is a front elevation view of the first embodiment.
Figure 3:
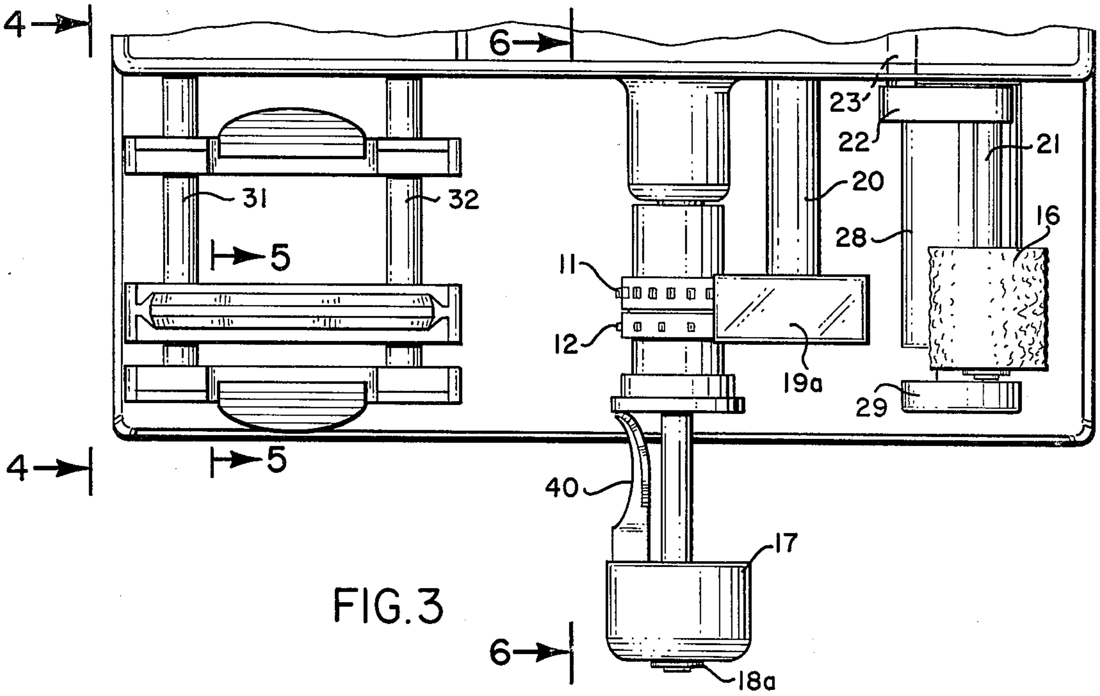
FIG. 3 is a top plan view of the first embodiment.

Referring now to FIGS. 1, 2 and 3 of the drawings, an improved apparatus 10 is shown for repairing sprocket holes on film, such as motion picture film. One feature of this improved apparatus is the provision of two sprocket wheels 11 and 12, and two elongated guides 13, and 14 for the film being fed into the sprocket wheels, thus allowing the dual use of the apparatus to repair 35 mm film and 16 mm film. The guides are comprised of outside members 13*a* and 14*a*, and a common member 15. These guides are aligned to feed the film into the sprocket wheel in a plane approximately at, or slightly above a horizontal plane tangent with the sprocket wheels, as shown in FIG. 2. A sponge rubber roller 16 presses the film down onto the sprocket wheel with sprocket holes engaging two sprockets. If holes in the film are not initially engaging the sprockets, a slight turn clockwise of a knob 17 will turn the sprocket wheel until sprockets engage holes in the film. Continued turning transports the film through the guide and past the sprocket wheel and pressure roller. Both sprocket wheels are mounted on and attached to the same shaft 18 of the knob 17 so that both will turn together, even though only one will normally be in use at one time. On the downstream (output) side of the sprocket wheels, there is a member 19 mounted on a shaft 20 with a flat surface 19*a* approximately in the same plane as the plane on which film is being fed by the guides, but rotated slightly on the shaft 20 counter clockwise to tilt the edge of the flat surface 19*a* near the sprocket wheels down just enough to allow the sponge pressure roller to press film onto a sufficient section of the sprocket wheels to assure that at least one sprocket engages a film hole at all times as the film is pulled through the repair station, as shown in FIG. 2.

The roller 16 is mounted on a shaft 21 on the end of an arm 22. The arm is in turn attached to a shaft 23 supported between two walls of a hollow support 24. The shaft 23 is bent to form a bit-shaped crankshaft, and a spring 25 is stretched between a point 26 on the inside of a wall of the hollow support 24 and the crankshaft. When the roller is manually raised away from the sprocket wheels, the arm 22 cranks the crankshaft 23 and spring 25 over center thereby holding the sponge roller in the raised position shown in FIG. 1 (and shown in dotted lines in FIG. 2). When the roller is manually returned to a position on the sprocket wheels, the crankshaft and spring again pass over center to hold the roller down on the sprocket wheels as shown in FIG. 2, with pressure on the sprocket wheels determined by the tension of the spring in that position.

One or two rolls of pressure adhesive repair tape 27 are mounted on a spindle 28 comprised of a thick rubber sleeve over a threaded support shaft 28*a*. By turning a knob 29 on the end of the shaft 28*a* clockwise, the rubber sleeve is compressed on the support shaft enough to provide sufficient drag on a spool 30 for the tapes, so that the tape wrapped over a sprocket wheel is maintained taut as it is pulled off the roll when the sprocket wheel is turned clockwise. The holes in the repair tape are placed over the sprockets of the wheel over about 120°, with the end of the tape about 45° from the top of the wheel ready to engage film when film is placed in position with the pressure roller down. Slowly turning the knob 17 will then bring the repair tape into engagement with the film, and in the process bring sprockets into engagement with sprocket holes in the film ahead of a section to be repaired. Further turning of the knob 17 will cause film and repair tape to be fed together with their holes aligned, and due to the precise alignment of the film by the guide, with the side edges of the holes aligned. Note that a section of film may have all the material between a series of holes missing, but the repair tape having holes engaged by the sprockets will transport film through the repair station.

Figure 4:
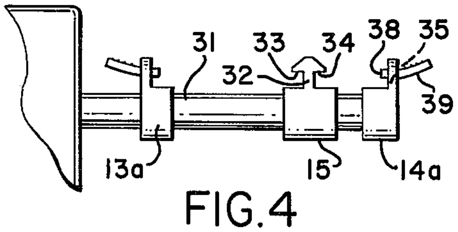
FIG. 4 is a view taken along a line 4—4 in FIG. 3.
Figure 5:
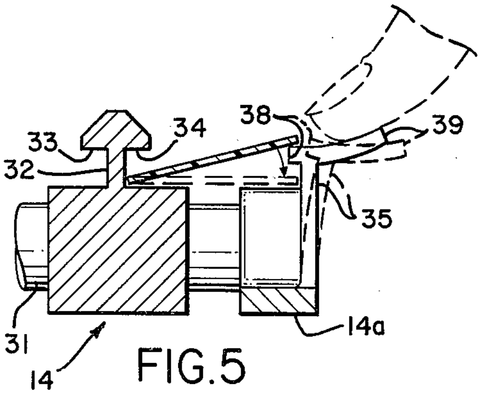
FIG. 5 is a view taken along a line 5—5 in FIG. 3.

The structure of the guides can be better described with reference to the end view of the guides in FIG. 4 and a sectional view of the guide 14 in FIG. 5. The guides are mounted on cantilevered shafts 31 and 32, as shown in FIGS. 1, 2, and 3 to allow precise alignment with the sprocket wheels. The guide member 15 common to both guides has a vertical wall 32 in the center and flanges 33, 34 on top of the wall overhanging the horizontal flat surface of the member. The edge of a film being inserted into the guide is simply inserted between the flange and the flat surface, as shown in FIG. 5 for the guide 14. The other member of each guide also has a vertical wall and a flat surface inside the vertical wall. Since both members 13*a* and 14*a* are alike, only the member 14*a* will be further described.

Vertical wall 35 of the member 14*a* is provided with vertical slots 36, 37 (FIG. 2) to provide a central section extending upwardly from the flat horizontal surface of the guide member to a flange 38 overhanging the flat surface, and a flange 39 extending outwardly. The flanges 38 and 39 run the full length of the section with the same dimension. Flange 39 is provided to permit an operator to push downwardly, and outwardly, in order to bend the section enough to allow the flange 38 to clear the film being dropped into the guide, as shown in FIG. 5. The guide members are made of flexible material so that when released, the section between the slots 36 and 37 will return to its upright position to place the flange 38 over the film. The vertical walls will then guide the film while the flanges overhanging the horizontal flat surfaces will hold the film in the guides between the vertical walls as film is pulled by the sprocket wheel.

Figure 6:
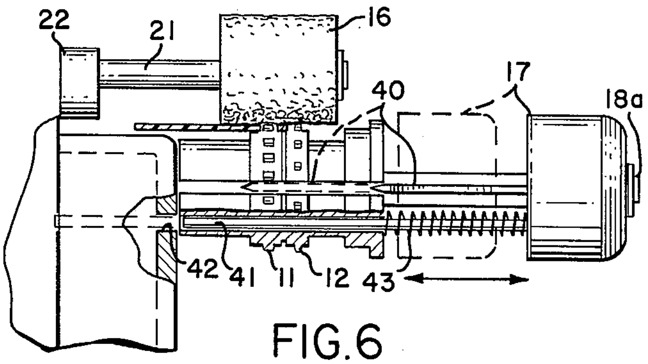
FIG. 6 is a view taken along a line 6—6 in FIG. 3 with part of the structure broken away for emphasis of particular structure provided for cutting repair tape.
Figure 7:
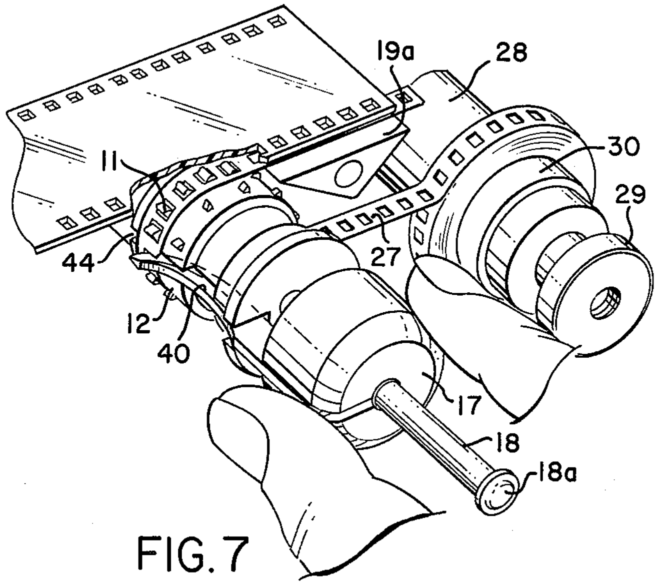
FIG. 7 is a perspective view of the structure of FIG. 6 illustrating the manner of its use to cut repair tape.

Once enough film has been pulled through by the sprocket wheel to repair or reinforce a section of film, the knob 17 is turned until a knife blade 40 is in a position shown in the FIGS. 1 and 3 of the drawings at about 9 o'clock. In that position, a pin 41 attached to the knob 17, and passing through the sprocket wheels, is aligned with a hole 42 in the wall of the support so that the knob 17 can be pushed in against the force of a spring 43 as shown in FIGS. 6 and 7. The knob slides on the support shaft 18 and carries the knife blade 40 across the repair tape on either sprocket wheel. A slot 44 in the sprocket wheels, and any support structure for the sprocket wheels, allows the knife blade to pass through the repair tape to be cut. Note that the blade is curved so that as the free end moves in, it passes over the tape, but the rest of the blade cuts through the tape as shown in FIG. 7. Note also that although the return spring 43 is placed on the pin 41, it could just as well be placed on the shaft 18. The shaft 18 has a flange 18*a* to prevent the knob from sliding off the shaft.

Figure 8:
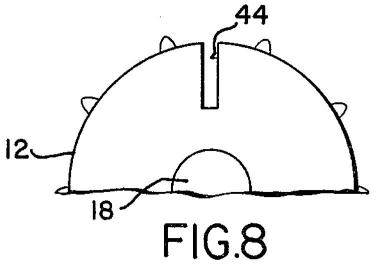
FIG. 8 illustrates the profile of a sprocket in the sprocket wheel of apparatus shown in FIG. 1.

From the foregoing, it can be appreciated that the present invention provides apparatus 10 capable of repairing sprocket holes in selected sections of substantially continuous film with more precise hole alignment than heretofore possible, and with greater facility in inserting the beginning of a section of film in a guide, placing a pressure roller over the film, and cutting the repair tape at the end of the section, all with less possibility of damage to the film itself as it is processed through the repair station. This last feature of probability of damage is served in part by the improved guides, and in part by the improved symmetrical profile of sprockets on the sprocket wheel, as shown for the sprocket wheel 14 in FIG. 8. Both faces of each sprocket have a surface cut on radius of approximately 0.077 inches for more gentle engagement and disengagement of sprocket holes in the film. The film is pinched between the roller and the wheel for the sprocket so that the film is actually transported more by that pinch action than the sprockets. The sprockets then serve only to adjust the space between sprocket holes in the repair tape with the holes in the film.

Figure 9:
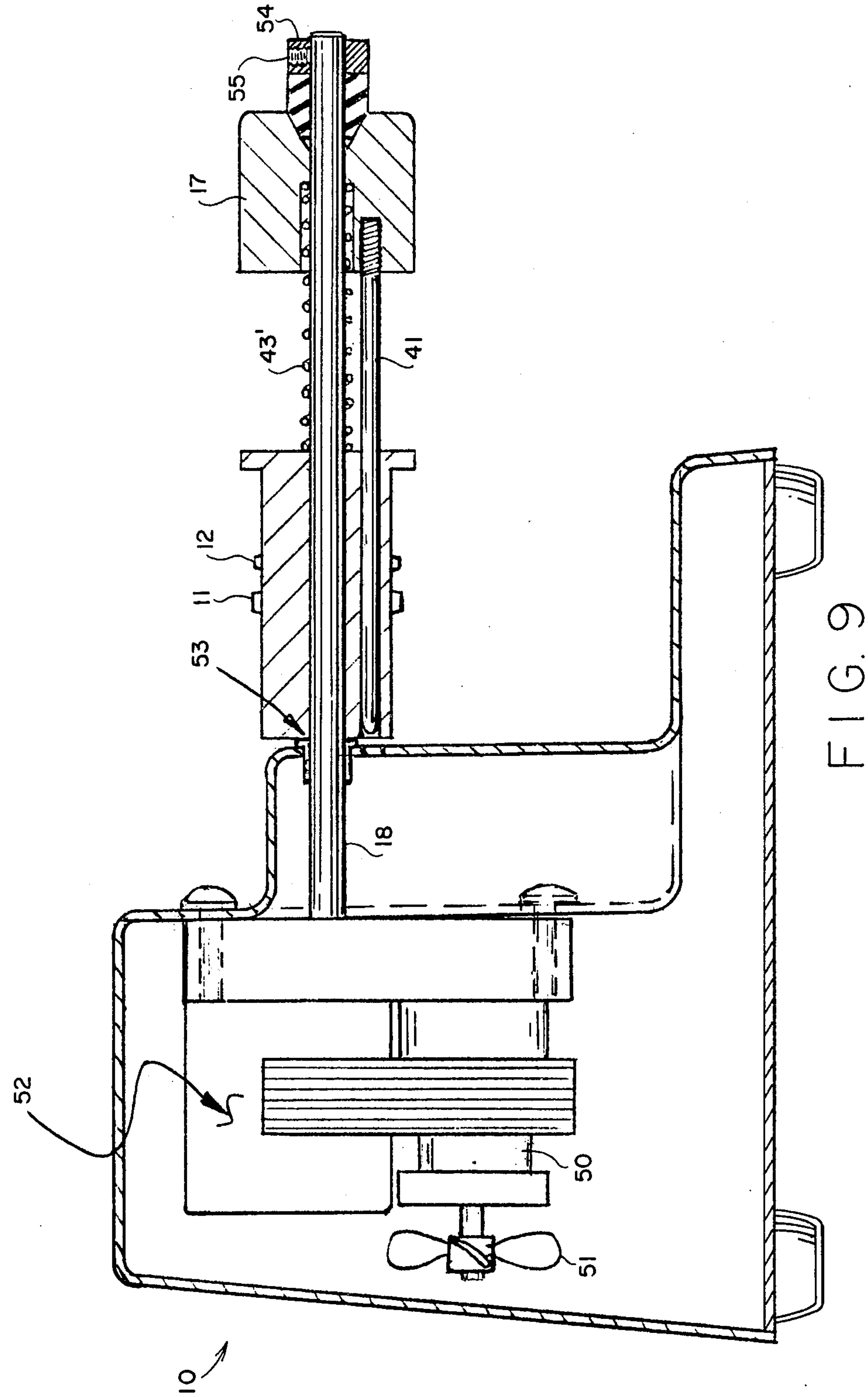
FIG. 9 illustrates a second embodiment of the invention.

Referring now to FIG. 9 a second embodiment of the invention is shown wherein the arrangement and operation of components are so much the same that the same reference numerals are retained, and only the differences will now be described. The differences all relate to the feature of an electric motor 50 with a cooling fan 51 that drives the shaft 18 through a gear box 52. The latter reduces the speed of the motor to a desired speed of the shaft 18. A bearing 53 allows the shaft 18 to turn freely.

The sprocket wheels 11 and 12 are not locked to the shaft, except through the knob 17 and the pin 41, and the knob 17 is coupled to the shaft only by a cone-type friction clutch. The spring 43 of the first embodiment on the pin is now provided as a larger diameter spring 43' on the shaft 18 to press the knob 17 onto the cone-type clutch with even pressure over 360° of the cone surface. A disk held on the end of the shaft by a set screw 55 holds the cone-type clutch on the shaft. The clutch material is preferably a hard rubber which does not significantly compress under the low spring pressure applied, but which has the desired friction to allow the shaft to drive the knob, and therefore the sprocket wheel with a normal load of film being processed through. Should any unusual load occur, such as jamming of the supply reel, the friction of the clutch will be overcome, and the clutch will slip, thereby maintaining no more than some predetermined maximum tension on the film being processed through the repair station.

Although a particular embodiment of the invention has been described and illustrated herein, it is recognized that modifications and equivalents may readily occur to those skilled in this art. Consequently, it is intended that the claims be interpreted to cover such modifications and equivalents.

What is claimed is:

1. An apparatus for repairing sprocket holes on a selected section of film by bonding a pressure adhesive repair tape along the length of the film over the sprocket holes, said tape having matching sprocket holes, and said apparatus having a repair station comprised of a wheel on a shaft extending from a support wall, said wheel having sprockets spaced for the sprocket holes of said film, and a pressure roller for pressing film onto the adhesive side of said repair tape for bonding on said film as said sprocket wheel is rotated, an improvement comprising a knob on said sprocket wheel shaft, a spring biasing said knob away from said sprocket wheel, a pin connected to said knob off center, said pin extending parallel to said shaft through a hole in said sprocket wheel to engage said sprocket wheel for turning with said knob, said pin extending from said knob to a point very near said support wall, a knife blade having a cutting edge secured to said knob, the cutting edge of said blade being disposed from a point at the free end thereof on one side of the circumference of said sprocket wheel to a point at the butt end thereof on the other side of the circumference of said sprocket wheel when the knob is in its extended position on said shaft, a slot in said sprocket wheel in line with said knife blade to permit said cutting edge to cut repair tape wrapped on said sprocket wheel when said knob is pushed in, and an opening in said support wall to receive said pin when said knob is in a position for the knob to be pushed in against said spring to cut repair tape without cutting film.

2. An improvement as defined in claim 1 wherein said opening is positioned on said wall for cutting said repair tape at an angular position of said sprocket wheel where said slot in the sprocket wheel is approaching the point at which said film comes in contact with said repair tape.

3. An improvement as defined in claim 2 wherein said film is fed through said repair station in a substantially straight line from an elongated flat guide on the input side to a flat member on the output side, said elongated guide having side walls perpendicular to a flat surface for guiding the edges of film into the sprocket wheel, said side walls having flanges overhanging said flat surface.

4. An improvement as defined in claim 3 wherein one side wall of said guide has a flange overhanging a flat surface only over a central section, said central section being separated from the remaining length thereof by slots to permit said central section to be flexed outwardly sufficiently to allow film to be dropped into said guide past the flange of the central section.

5. An improvement as defined in claim 4 wherein said central section has a flange extending outwardly to permit the central section to be flexed outwardly by pushing manually outwardly and downwardly on said outwardly extending flange.

6. An improvement as defined in claim 3 wherein said shaft has more than one sprocket wheel, each sprocket wheel being for film of different gauge, and an elongated flat guide for each sprocket wheel, each one having side walls spaced for film gauge to be received by said sprocket wheels, whereby film of more than one gauge may be readily repaired without adjustments to said apparatus.

7. An improvement as defined in claim 6 wherein one side wall is common to two flat guides, and said common wall has a flange overhanging a flat surface on each side thereof.

8. An improvement as defined in claim 7 wherein the outside wall of each guide has a flange overhanging a flat surface only over a central section separated from the remaining length of wall by slots to permit said central section to be flexed outwardly sufficiently to allow film to be dropped into the guide past the flange of the central section.

9. An improvement as defined in claim 8 wherein the central section of the side wall of each guide has a flange extending outwardly to permit the central section to be flexed outwardly by manually pushing outwardly and downwardly on said outwardly extending flange.

10. An apparatus for repairing sprocket holes on a selected section of film by bonding a pressure adhesive repair tape along the length of the film over the sprocket holes, said tape having matching sprocket holes, and said apparatus having a repair station comprised of a wheel on a shaft, said wheel having sprockets spaced for the sprocket holes of said film, and a pressure roller for pressing film onto the adhesive side of said repair tape for bonding on said film as said sprocket wheel is rotated, an improvement wherein said film is fed through said repair station in a substantially straight line from an elongated flat guide on the input side to the output side, said elongated guides having side walls perpendicular to a flat surface for guidng the edges of film into the sprocket wheel, said side walls having flanges overhanging said flat surface, and wherein one side wall of said guide has a flange overhanging a flat surface supported by flexing means for permitting the flange of said one wall to be flexed outwardly sufficiently to allow film to be placed into or removed from said guide past the flange of said one wall.

11. An improvement as defined in claim 10 wherein said flexing means has a flange extending outwardly to permit the flexing means to be flexed outwardly by pushing manually outwardly and downwardly on said outwardly extending flange.

12. An apparatus for repairing sprocket holes on a selected section of film by bonding a pressure adhesive repair tape along the length of the film over the sprocket holes, said tape having matching sprocket holes, and said apparatus having a repair station comprised of a wheel on a shaft, said wheel having sprockets spaced for the sprocket holes of said film, and a pressure roller for pressing film onto the adhesive side of said repair tape for bonding on said film as said sprocket wheel is rotated, an improvement wherein said film is fed through said repair station in a substantially straight line from an elongated flat guide on the input side to a flat member on the output side, said elongated guides having side walls perpendicular to a flat surface for guiding the edges of film into the sprocket wheel, said side walls having flanges overhanging said flat surface, wherein said shaft has more than one sprocket wheel, each sprocket wheel being for film of different gauge, and an elongated flat guide for each sprocket wheel, each one having side walls spaced for film gauge to be received by said sprocket wheels, whereby film of more than one gauge may be readily repaired without adjustments to said apparatus, and wherein a wall of each guide has a flange overhanging a flat surface supported by flexing means for permitting the flange of said one wall to be flexed outwardly sufficiently to allow film to be dropped into the guide past the flange.

13. An improvement as defined in claim 12 wherein one side wall is common to two flat guides, and said common wall has a flange overhanging a flat surface on each side thereof.

14. An improvement as defined in claim 12 wherein the flexing means of the side wall of each guide has a flange extending outwardly to permit the flexing means to be flexed outwardly by manually pushing outwardly and downwardly on said outwardly extending flange.

15. An apparatus for repairing sprocket holes on a selected section of film by bonding a pressure adhesive repair tape along the length of the film over the sprocket holes, said tape having matching sprocket holes, and said apparatus having a repair station comprised of more than one wheel on a shaft, each wheel having sprockets spaced for the sprocket holes of different gauge film, and a pressure roller for pressing film onto the adhesive side of said repair tape for bonding on said film as said sprocket wheel is rotated, said film being fed through said repair station in a substantially straight line from an elongated flat guide for each sprocket wheel on the input side of the sprocket wheel to the output side, said elongated guides having side walls perpendicular to a flat surface for guiding the edges of film into the sprocket wheel, said side walls having flanges overhanging said flat surface, and one side wall of each of said guides having a flange overhanging a flat surface by flexible means for permitting the flange of said one wall to be flexed outwardly sufficiently to allow film to be dropped into said guide past the flange.

16. An improvement as defined in claim 15 wherein said flexing means has a flange extending outwardly to permit the flexing means to be flexed outwardly by pushing manually outwardly and downwardly on said outwardly extending flange.

17. An improvement as defined in claim 16 wherein one side wall is common to two flat guides, and said common wall has a flange overhanging a flat surface on each side thereof.

18. An apparatus for repairing sprocket holes on a selected section of film by bonding a pressure adhesive repair tape along the length of the film over the sprocket holes, said tape having matching sprocket holes, and said apparatus having a repair station comprised of a wheel on a shaft extending from a support wall, said wheel having sprockets spaced for the sprocket holes of said film, and a pressure roller for pressing film onto the adhesive side of said repair tape for bonding on said film as said sprocket wheel is rotated, an improvement comprising a knob on the end of said sprocket wheel shaft, a friction clutch at the end of said shaft, a spring biasing said knob away from said sprocket wheels and against said friction clutch, a pin connected to said knob off center, said pin extending parallel to said shaft through a hole in said sprocket wheel to engage said sprocket wheel for turning said knob, and motor means for turning said shaft, whereby said shaft drives said sprocket wheel through said knob except while said knob is pressed in toward said sprocket wheel against said spring.

19. Apparatus as defined in claim 18 wherein said pin extends from said knob to a point very near said support wall, a knife blade having a cutting edge secured to said knob, the cutting edge of said knife being disposed from a point at the free end thereof outside the circumference of said sprocket wheel to a point at the butt end thereof inside the circumference of said sprocket wheel when the knob is in its extended position on said shaft, a slot in said sprocket wheel in line with said knife blade to permit said cutting edge to cut repair tape wrapped on said sprocket wheel, and an opening in said support wall to receive said pin when said knob is in a position for the knob to be pushed in against said spring to cut repair tape without cutting film.

* * * * *